March 1, 1949.　　　　A. C. LIND　　　　2,463,464
LIQUID CLARIFYING APPARATUS
Filed Oct. 1, 1945　　　　　　　　　　2 Sheets-Sheet 1
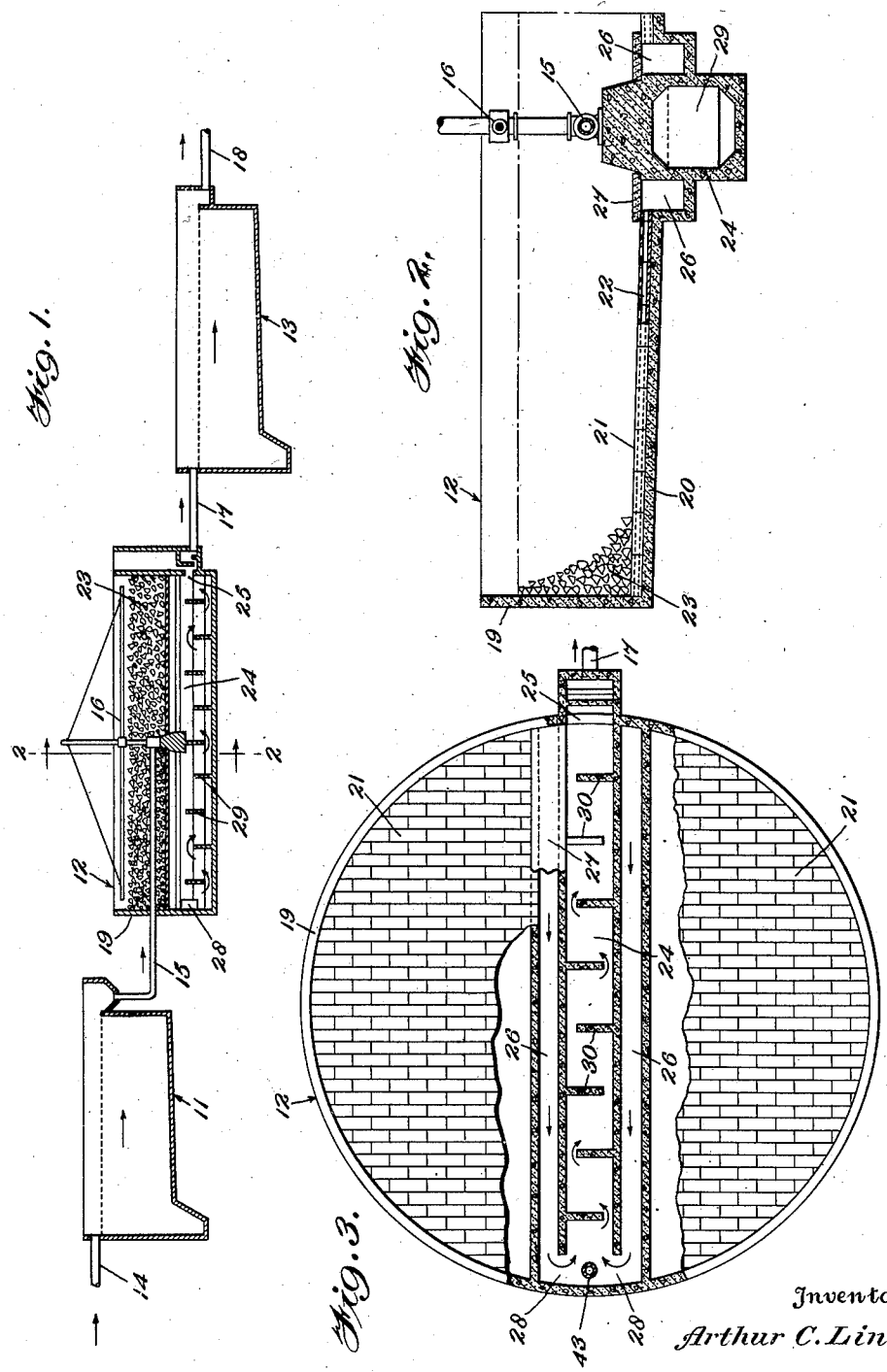
Inventor
Arthur C. Lind,
Attorney March 1, 1949. A. C. LIND 2,463,464
LIQUID CLARIFYING APPARATUS
Filed Oct. 1, 1945 2 Sheets-Sheet 2

Inventor
Arthur C. Lind,
Attorney

Patented Mar. 1, 1949

2,463,464

UNITED STATES PATENT OFFICE 2,463,464

LIQUID CLARIFYING APPARATUS

Arthur C. Lind, Milwaukee, Wis., assignor to Chain Belt Company, Milwaukee, Wis., a corporation of Wisconsin Application October 1, 1945, Serial No. 619,537

2 Claims. (Cl. 210—7)

The invention relates to liquid clarification systems, more particularly those employing trickling filters, and has for its principal object to increase the efficiency of such systems by providing an improved trickling filter therefor.

In systems of this character the liquid to be clarified is usually first passed through a primary sedimentation tank, where a relatively large proportion of the settleable solids carried by the liquid is removed. The effluent from this tank, which is passed to the filter, ordinarily contains considerable finely divided suspended solids which are settleable only with difficulty, and while it is not the primary function of the filter to extract them from the liquid, yet present day filters may remove as much as 25% of these solids. The filter is primarily an oxidizing device the function of which is to secure as nearly as possible the complete oxidation of the organic matter carried by the liquid, and in so doing it may incidentally change the character of at least some of the suspended solids whereby they will settle more readily when the filter effluent is passed through a secondary sedimentation tank, as is usually done.

It is nevertheless an established fact that the effluent from a trickling filter, particularly from a "high rate" filter, ordinarily contains a considerable quantity of finely divided suspended matter of an extremely light and filmy nature which is rather difficult to settle in a conventional sedimentation basin. However, if this effluent be subjected to a gentle mixing or stirring action this light and filmy matter tends to agglomerate into a floc which is large enough and heavy enough to settle quite thoroughly in a settling basin.

The present day trickling filter usually comprises a circular basin of concrete, masonry or the like, the floor of which is covered with a layer of drain tile providing numerous small drain passages leading to a main collection channel. A bed of crushed stone or similar filter material surmounts the tile to a depth of from 3 to 10 feet, and the liquid is sprinkled over the top of this bed by rotating distributing arms or pipes. The collection channel is usually disposed diametrically of the basin below the floor, with the latter as well as the tiles and drain passages sloping slightly to it from either side. In some instances, however, the collection channel is of arcuate form, following approximately 180° of the basin wall, in which case the floor and drain passages all slope in the same direction to it.

The present invention proposes to utilize this collection channel as a flocculating chamber, whereby at a relatively small increase in the cost of the filter, the settleability of the solids in the effluent of the filter may be materially increased. To this end the channel is made somewhat larger than is usual in this class of apparatus to constitute a detention chamber in which the effluent may be retained for a period of time sufficient to enable it to be subjected to a gentle agitation or stirring which will flocculate the finely divided suspended solids; and means are provided in the chamber for producing such stirring or mixing action.

While the tile drain passages may discharge directly into this chamber, this will result in liquid received from passages near the chamber outlet being detained for shorter periods of time than liquid received from passages farther removed from said outlet and thus all portions of the liquid will not receive uniform treatment. It is preferred therefore, to provide one or more gutters paralleling the chamber for receiving the liquid from the tile passages, which gutters discharge all of the liquid into the chamber at substantially the point farthest removed from the chamber outlet. In this way all portions of the liquid are caused to pass completely through the chamber and are thus uniformly treated.

Several different forms of apparatus in accordance with the invention are illustrated in the accompanying drawings forming a part of this specification, in which:

Figure 1 is a vertical sectional view, largely diagrammatic, of a conventional trickling filter system incorporating a filter constructed in accordance with one form of the invention;

Fig. 2 is a partial cross sectional view, on a somewhat larger scale, of the filter shown in Fig. 1, on approximately the plane indicated by the line 2—2 of the latter figure;

Fig. 3 is a plan view, partly broken away and in section, of a slightly modified form of the invention, the bed of filter material and the liquid distributing mechanism being omitted, and the drain tiles being shown more or less diagrammatically;

Figure 4:
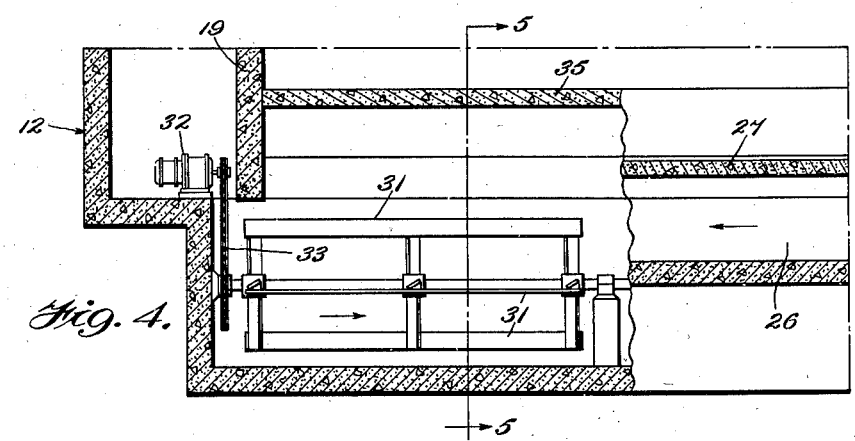
Fig. 4 is a fragmentary sectional view of a further modified form of the invention, wherein the flocculating chamber is provided with a power driven mechanical agitator.

Referring first to Figs. 1 and 2, 11 indicates a conventional primary sedimentation tank, 12 a trickling filter and 13 a conventional secondary sedimentation tank. The tank 11 is supplied with raw liquid to be clarified by a pipe or conduit 14, and the effluent from the said tank is conducted by a pipe 15 to the rotary distributor or sprinkler 16 of the filter. The effluent from the latter flows through a pipe 17 to the secondary settling tank 13, which discharges through a pipe or conduit 18.

The filter 12 comprises a circular basin having a side wall 19 and a floor 20 upon which conventional drain tiles 21 (Fig. 2) are laid, said tiles providing drain passages 22, as is well understood in the art. A bed of broken stone or like filter material 23 is deposited on the tiles 21, and the liquid from pipe 15 is sprinkled over the top surface of this bed by the rotary distributor 16, and trickles downwardly through the interstices of the bed to the tile passages 22.

The flocculating chamber referred to above is indicated at 24 and is constructed below the floor of the basin, along a diameter thereof, in a manner similar to the collecting channels heretofore so disposed. This chamber however, is larger than such channels, being of such dimensions relative to the capacity of the apparatus as to provide for detention of the liquid therein for a period of say 10 minutes, during which time the liquid is subjected to gentle stirring or agitation by appropriate means, as will appear more fully below. The chamber is provided at one end with a baffled outlet port 25 through which the effluent is discharged to the pipe 17 for transfer to the secondary tank 13.

As above indicated, the drain tile passages 22 may discharge directly into this chamber, but for reasons previously explained, it is preferable to provide a gutter 26 along each side of the chamber into which the passages 22 discharge. These gutters may be provided with removable cover slabs 27 whereby access to the gutters may be had if necessary, of course after removal of at least those portions of the filter material 23 normally disposed thereover. The gutters communicate with the chamber 24 only through ports 28 at the end of the chamber opposite its outlet port 25, and thus all of the liquid is compelled to pass completely through the chamber, thereby insuring substantially uniform treatment thereof.

All of the several forms of the invention shown in Figs. 1–6 of the present drawings are essentially similar insofar as the features thus far described are concerned, and they therefore have been designated by like reference characters throughout these views. The essential difference between these various forms lies in the several means provided in the flocculating chamber 24 for subjecting the liquid therein to gentle stirring or agitation whereby to flocculate at least a large portion of the light and filmy solids carried by the liquid after passing through the filter bed.

Figures 5, 6:
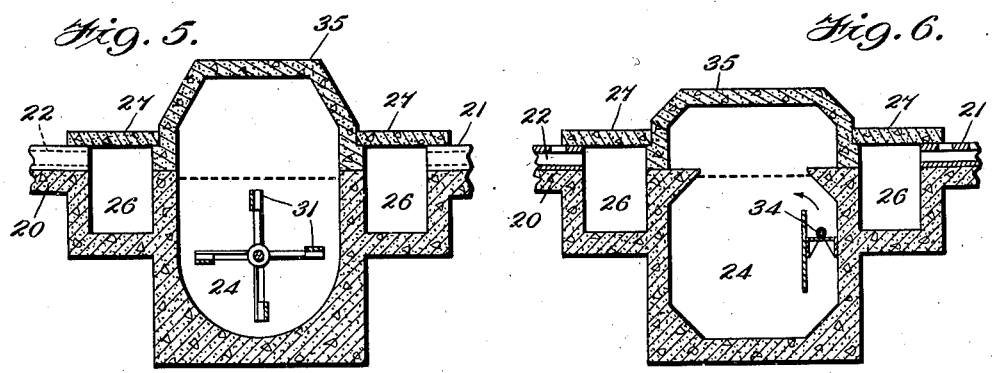
Fig. 5 is a cross sectional view taken on the line 5—5 of Fig. 4, looking in the direction of the arrows.
Fig. 6 is a view similar to Fig. 5, illustrating a still further modified form of the invention wherein the agitation is provided by fluid pressure.

In Figs. 1 and 2 the agitation means comprises a series of vertically staggered or "over and under" baffles 29 disposed throughout the length of the chamber, while in Fig. 3 said means comprise a similar series of baffles 30 staggered horizontally to produce a zigzag flow. In Figs. 4 and 5 the agitating means comprise a series of rotary paddles 31, driven at a low speed by a motor 32 through a chain and sprocket drive 33. In the form shown in Fig. 6 agitation of the liquid is accomplished by diffusing air or like gas into the liquid from a pipe 34 extending longitudinally of the chamber throughout its length and below the liquid level. It will be noted from Figs. 4, 5 and 6 that the chamber 24 is provided with removable arched cover members 35, except at its mid point where it serves to support the liquid distributing mechanism 16, as shown in Figs. 1 and 2.

Figures 7, 8:
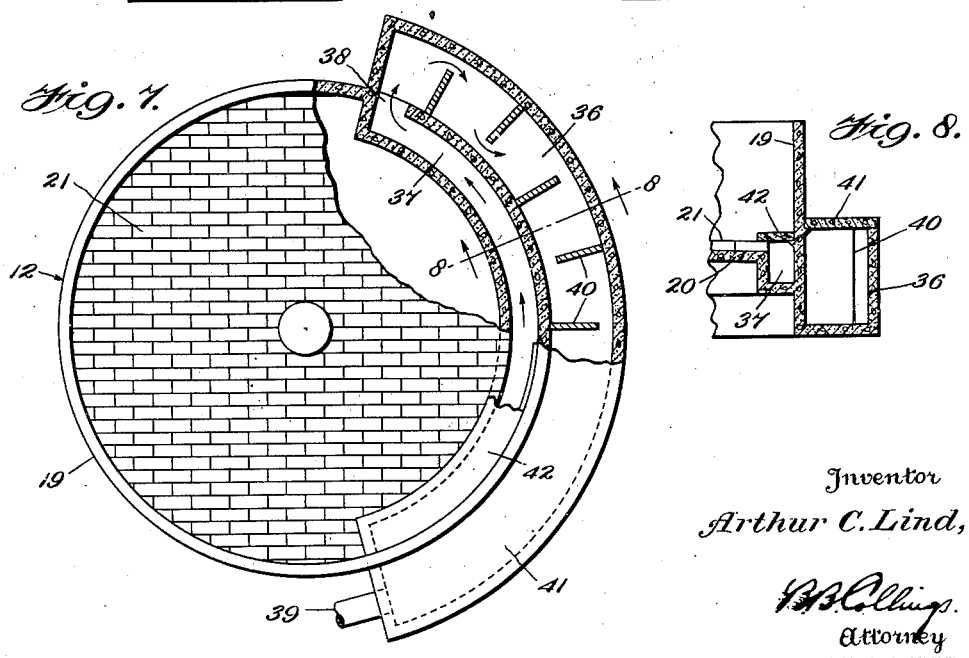
Fig. 7 is a plan view, partly broken away and in section, showing an application of the invention to a filter having an arcuate form of collection channel.
Fig. 8 is a cross sectional view on the line 8—8 of Fig. 7, looking in the direction of the arrows.

In Figs. 7 and 8 there is illustrated an application of the principles of the invention to the periphery of the filter basin rather than to its diameter. Here the flocculating chamber 36 is of arcuate form and is disposed outside the vertical wall 19 of the basin, extending through an arc approaching 180°. In this case the basin floor 20 and drain tiles 21 slope wholly from left to right, as viewed in Fig. 7, with the tile passages discharging into an arcuate gutter 37 inside the wall 19, which gutter discharges through a port 38 in said wall into one end of the chamber 36. The effluent is discharged from the other end of the chamber through a pipe 39, and the chamber is shown as provided with a series of horizontally staggered baffles 40 as typical of the agitation means therein. Obviously, vertically staggered baffles or an air diffusing pipe might be employed in lieu of the baffles 40. The chamber may be provided with a removable cover 41, and the gutter with a similar cover 42.

Should it be desired to add chemicals to the liquid to improve flocculation, as is sometimes done, this would preferably be done at the inlet end of the chamber 24, as by means of a pipe or conduit 43, Fig. 3.

What is claimed is:

1. In liquid clarification apparatus, the combination of a filter basin having a floor for supporting a bed of filter material, said floor being provided with a plurality of drain passages for receiving liquid passing through said filter bed from substantially the entire area thereof; means for introducing liquid carrying suspended solids into the basin; means providing a chamber at substantially the level of said basin floor, through which the liquid may be passed and in which it may be detained for a time sufficient to enable coagulation of unsettleable solids suspended in the liquid, by gentle agitation of the latter, whereby to produce settleable flocs of such solids, said chamber having an outlet; means providing a collecting channel adjacent said chamber, communicating with each of said drain passages whereby to collect the liquid from all thereof, said channel discharging into the chamber at a point substantially farthest removed from said chamber outlet whereby all portions of the liquid are caused to pass completely through the chamber; and means for gently agitating the liquid within the chamber to produce said settleable flocs.

2. In liquid clarification apparatus, the combination of a filter basin having a floor for supporting a bed of filter material, said floor being provided with a plurality of drain passages for receiving liquid passing through said filter bed from substantially the entire area thereof; means for introducing liquid carrying suspended solids into the basin; means providing an elongated chamber extending along a portion of the basin floor for receiving and detaining said liquid, said chamber having an outlet at one end thereof; means providing a channel contiguously paralleling said chamber and communicating with each of said drain passages whereby to collect the liquid from all of the passages, said channel discharging into the chamber at a point substantially farthest removed from said chamber outlet whereby all portions of the liquid are caused to pass completely through the chamber; and baffle means within the chamber for producing gentle agitation of the liquid traversing the same, whereby to coagulate unsettleable solids suspended in the liquid and produce settleable flocs thereof.

ARTHUR C. LIND.

REFERENCES CITED

The following references are of record in the file of this patent:

UNITED STATES PATENTS

| Number | Name | Date |
| --- | --- | --- |
| 272,806 | Wass | Feb. 20, 1883 |
| 2,058,044 | Spencer | Oct. 20, 1936 |
| 2,065,123 | Downes | Dec. 22, 1936 |
| 2,141,979 | Halvorson et al. | Dec. 27, 1938 |
| 2,168,208 | Jenks | Aug. 1, 1939 |
| 2,308,866 | Dekema | Jan. 19, 1943 |
| 2,387,101 | Walker | Oct. 16, 1945 |
| 2,388,795 | Montgomery et al. | Nov. 13, 1945 |